(12) United States Patent
Beigl et al.

(10) Patent No.: US 7,356,495 B2
(45) Date of Patent: Apr. 8, 2008

(54) SUPPLY CHAIN MANAGEMENT USING ITEM DETECTION SYSTEM

(75) Inventors: Michael Beigl, Karlsruhe (DE); Christian Decker, Karlsruhe (DE); Uwe Kubach, Waldbronn (DE)

(73) Assignee: SAP Aktiengesellschaft, Walldorf (DE)

( * ) Notice: Subject to any disclaimer, the term of this patent is extended or adjusted under 35 U.S.C. 154(b) by 1184 days.

(21) Appl. No.: 10/372,671

(22) Filed: Feb. 25, 2003

(65) Prior Publication Data

US 2003/0222762 A1 Dec. 4, 2003

Related U.S. Application Data

(60) Provisional application No. 60/384,826, filed on Jun. 4, 2002.

(51) Int. Cl.
*G06Q 10/00* (2006.01)

(52) U.S. Cl. .................. 705/28; 705/22; 340/10.3; 340/511

(58) Field of Classification Search .................. None
See application file for complete search history.

(56) References Cited

U.S. PATENT DOCUMENTS

| | | | |
|---|---|---|---|
| 4,636,950 A | | 1/1987 | Caswell et al. |
| 5,712,989 A | | 1/1998 | Johnson et al. |
| 5,884,300 A | | 3/1999 | Brockman |
| 5,920,261 A | | 7/1999 | Hughes et al. |
| 5,986,219 A | | 11/1999 | Carroll et al. |
| 6,148,291 A | * | 11/2000 | Radican ................. 705/28 |
| 6,320,169 B1 | * | 11/2001 | Clothier ................. 219/626 |
| 6,600,418 B2 | * | 7/2003 | Francis et al. ............ 340/572.1 |
| 6,650,227 B1 | * | 11/2003 | Bradin ................. 340/10.3 |
| 7,136,832 B2 | * | 11/2006 | Li et al. ................. 705/34 |
| 7,233,241 B2 | * | 6/2007 | Overhultz et al. ........ 340/539.2 |
| 2001/0034671 A1 | | 10/2001 | Luke et al. |
| 2002/0038267 A1 | | 3/2002 | Can et al. |
| 2002/0057208 A1 | | 5/2002 | Lin et al. |
| 2002/0143669 A1 | * | 10/2002 | Scheer ................. 705/28 |
| 2003/0047387 A1 | | 3/2003 | Bogat |
| 2003/0154141 A1 | * | 8/2003 | Capazario et al. ............ 705/27 |
| 2003/0216969 A1 | * | 11/2003 | Bauer et al. ................. 705/22 |

(Continued)

FOREIGN PATENT DOCUMENTS

GB 2 204 417 A 11/1988

(Continued)

OTHER PUBLICATIONS

Ericson, Jim, Line 56, *Smart Shelf Availability*, Nov. 18, 2002, E-Business Executive Daily.

(Continued)

*Primary Examiner*—F. Zeender
*Assistant Examiner*—John Shin
(74) *Attorney, Agent, or Firm*—Fish & Richardson P.C.

(57) ABSTRACT

A system to monitor item placement and item movement on surfaces includes an identification system embedded in one or more surfaces and a computer. The identification system periodically scans the surfaces to generate data related to items placed on the surfaces. The data includes item type, item location on each surface, and number of items placed on each surface. The computer receives and processes the data to monitor item placement and item movement on the surfaces.

31 Claims, 12 Drawing Sheets

U.S. PATENT DOCUMENTS

| | | | |
|---|---|---|---|
| 2004/0236698 A1* | 11/2004 | Sweeney .................... | 705/64 |
| 2005/0027604 A1* | 2/2005 | Bandy et al. ................ | 705/22 |
| 2005/0131785 A1* | 6/2005 | Yap ............................ | 705/35 |
| 2005/0160003 A1* | 7/2005 | Berardi et al. ............... | 705/14 |
| 2005/0219048 A1* | 10/2005 | Kimmel et al. ............ | 340/511 |
| 2005/0222933 A1* | 10/2005 | Wesby ........................ | 705/36 |
| 2006/0122925 A1* | 6/2006 | Wesby ........................ | 705/35 |
| 2006/0215593 A1* | 9/2006 | Wang et al. ................ | 370/315 |

FOREIGN PATENT DOCUMENTS

| | | |
|---|---|---|
| GB | EP 1049042 A1 * | 2/2000 |
| JP | 57 163826 A | 10/1982 |
| WO | WO 9739398 A2 * | 10/1997 |
| WO | WO 9905660 A1 * | 2/1999 |
| WO | WO 02 10040 | 2/2002 |
| WO | WO02/25230 A | 3/2002 |

OTHER PUBLICATIONS

Orr, Robert J. and Abowd, Gregory D., *The Smart Floor: A Mechanism for Natural User Identification and Tracking*, Proceedings of the 2000 Conference on Human Factors in Computing Systems (CHI 2000), The Hague, Netherlands, Apr. 1-6, 2000.

Siio, Itiro, *User Position Detection Using RFID Tags*, May 12, 2000; pp. 45-50.

*Lockheed to Use RFID on Shop Floor*, Nov. 8, 2002, RFID Journal, Inc., Copyright 2002.

*"Smart Shelves" Demo'ed at SAPPHIRE; SAP, Escort Memory Systems, and Philips Form Alliance*, Jun. 13, 2002, Supply Chain Systems, Helmers Publishing Inc.

*Patent Abstracts of Japan*, v. 0070, No. 02, p. 166, Jan. 7, 1983.

\* cited by examiner

SUPPLY CHAIN MANAGEMENT USING ITEM DETECTION SYSTEM

CROSS REFERENCE TO RELATED APPLICATION

This application claims priority from U.S. Provisional Application No. 60/384,826, filed Jun. 4, 2002, and titled SHELF WITH EMBEDDED ITEM DETECTION SYSTEM.

TECHNICAL FIELD

This disclosure relates to supply chain management systems and, more specifically, to supply chain management systems that include item detection systems that use radio frequency identification (RF-ID) tags.

BACKGROUND

Supply chain management systems oversee the flow of information, materials, and finances from manufacturer to wholesaler to retailer to consumer. One of the most important goals of supply chain management systems is to decrease inventory without decreasing the ability to provide goods when needed. Accurately tracking inventory and the movement of goods or items and providing this information "upstream" (to a company's suppliers) and "downstream" (to a company's customers) allows parties in the supply chain to decrease inventory by better managing current resources and by better predicting future needs.

Radio frequency identification (RF-ID) is a technology that leverages electromagnetic or electrostatic coupling to allow items to be tracked electronically without requiring direct contact or line-of-sight scanning of the items. Typical RF-ID systems consist of an antenna, a reader, and a tag that may be attached to an item to be tracked. The antenna uses radio frequency waves to activate the tag. The activated tag transmits data back to the antenna that is subsequently interpreted by the reader. The data may be used to identify and track the item.

SUMMARY

In one general aspect, a system to monitor item placement and item movement on surfaces includes an identification system embedded in one or more surfaces and a computer. The identification system periodically scans the surfaces to generate data related to items placed on the surfaces. The data includes item type, item location on each surface, and number of items placed on each surface. The computer receives and processes the data to monitor item placement and item movement on the surfaces.

Implementations may include one or more of the following features. For example, the item type may include one or more of an individual item number, as item name, an item manufacturer name, or an item product name. The identification system may be an RF-ID system that allows generation of the item-related data by scanning items placed on the surfaces. The items may include RF-ID tags. The scanning may be continuous so as to provide item-related data that may be used to monitor item placement and movement on the surfaces in real-time. The RF-ID system may include a set of inductor coils embedded in the surfaces that are energized during the scanning. The RF-ID system may include one or more reader microprocessor units and RF-ID tag readers that generate the item-related data by selectively energizing the set of inductor coils.

The surfaces may be surfaces of one or more shelves. The computer may provide a user interface that displays a graphical representation of one of the surfaces and the items on the surface.

The items may be products in a store or in a warehouse and the surfaces may be the surfaces of one or more store shelves or warehouse shelves. The computer may generate a message when the number of items placed on the surfaces of store shelves or warehouse shelves decreases below a predetermined threshold. The message may be an out-of-stock message and the items may be associated with a specific item manufacturer name or item product name.

The computer may determine whether items are correctly placed on portions of the surfaces of warehouse shelves or store shelves assigned to carry the items by comparing the item location on the surfaces of the shelves with shelf assignment data. The computer may generate a message when a number of items incorrectly placed on the surfaces of store shelves or warehouse shelves increases above a predetermined threshold. The computer may process the item-related data to determine an item placement on the shelves that increases item sales. The computer may generate a message when an event relating to item movement on the surfaces of shelves occurs. The event may correspond to an item being removed from the surface of a store shelf and neither bought nor put back on the shelf. The event may correspond to items being moved from the surfaces of shelves in response to changing the price of the items.

The computer may provide item-related data to a content based messaging network and may update the item-related data in real-time based on repeated scanning of the surfaces of the shelves. The item-related data may be accessible to a manufacturer or a distribution center associated with the store or the warehouse.

In another general aspect, a system includes an RF-ID item identification system and a supply chain management system. The RF-ID item identification system periodically generates data related to placement and movement of items in one or more supply chain nodes. The supply chain management system receives and processes the data to monitor inventory or customer behavior in the one or more supply chain nodes.

Implementations may include one or more of the following features. For example, the data may be generated in real-time. The supply chain node may be a retail store or a warehouse and the items may be goods in the store or warehouse. The items may be goods on shelves in the store or warehouse. The placement and movement of items may include placement and movement of items on shelves.

The RF-ID item identification system may include multiple RF-ID systems, each embedded in a shelf. The RF-ID system may include one or more master reader microprocessors each communicating with a plurality of slave reader microprocessors.

The supply chain management system may include a computer that receives the data and publishes it to a content-based messaging network. The manufacturer or distribution center may access the data in real-time by subscribing to receive the data from the content-based messaging network.

In another general aspect, a system includes a content based messaging network, an identification system embedded in one or more surfaces, a first computer, and a second computer. The identification system may periodically scan the surfaces to generate data related to items placed on the surfaces. The data may include item type, item location on each surface, and number of items placed on each surface. The first computer may be associated with the first supply chain node and may receive, process, and periodically publish the data to the content based messaging network. The second computer may be associated with a second supply chain node and may periodically receive the data from the content based messaging network.

Implementations may include one or more of the following features. For example, the frequently and periodically scanning, publishing, and receiving may include scanning, publishing, and receiving in real-time. The first supply chain node may be a retailer and the second supply chain node may be a manufacturer or distribution center.

DETAILED DESCRIPTION

Figure 1:
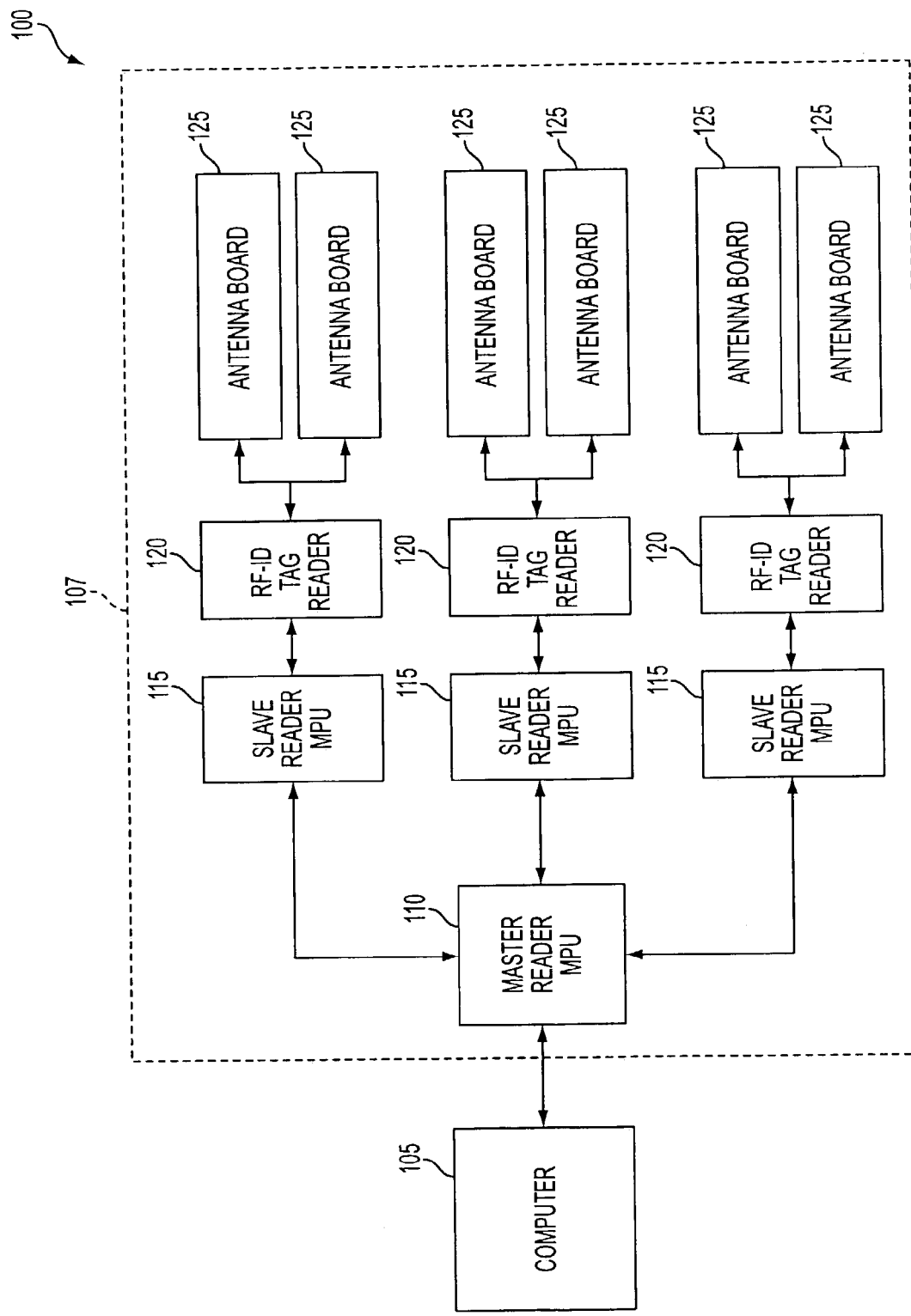
FIG. 1 is a functional block diagram for an item identification system.
Figure 2A:
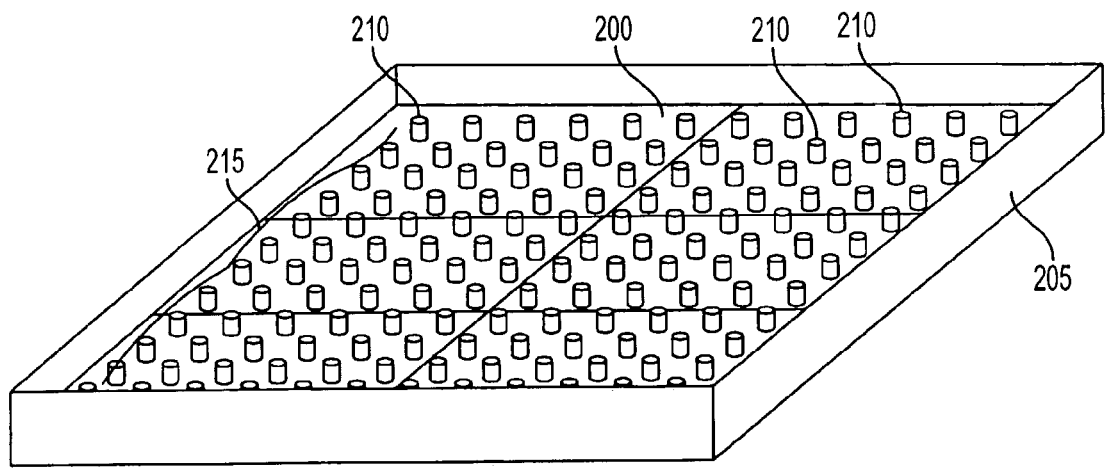
FIG. 2A shows an exemplary shelf with an embedded RF-ID system shown without a cover.

FIG. 1 shows a functional block diagram for an item identification system 100 that includes a computer 105 that interfaces with one or more radio frequency identification (RF-ID) systems 107, each of which may be embedded in a shelf. The RF-ID system 107 includes a master reader microprocessor unit 110 (MPU), three slave reader MPUs 115, three RF-ID tag readers 120, and six antenna boards 125. The computer 105 interfaces with the master reader MPU 110. The master reader MPU 110 controls the three slave reader MPUs 115, each of which is connected to an RF-ID tag reader 120 that detects signals from two antenna boards 125. In this implementation, six antenna boards 125 are placed together to form a 3×2 shelf surface 200 and inserted in a rectangular shelf housing 205 as shown in FIG. 2A. The rectangular shelf housing 205 may be made of plastic or a similar durable material that is permeable to magnetic fields. Each antenna board is a circuit board that includes twenty-four inductor coils 210 that are spaced evenly to form a 4×6 grid. When placed together, the six antenna boards 125 form the shelf surface 200 with a 12×12 grid 215 of inductor coils 210. The grid spacing may be, for example, 1.8 cm by 1.8 cm. The master reader MPU 110, the three slave reader MPUs 115, and the RF-ID tag readers 120 may be located on one or more circuit boards that are housed underneath the shelf surface 200 within the shelf housing 205.

Figure 2B:
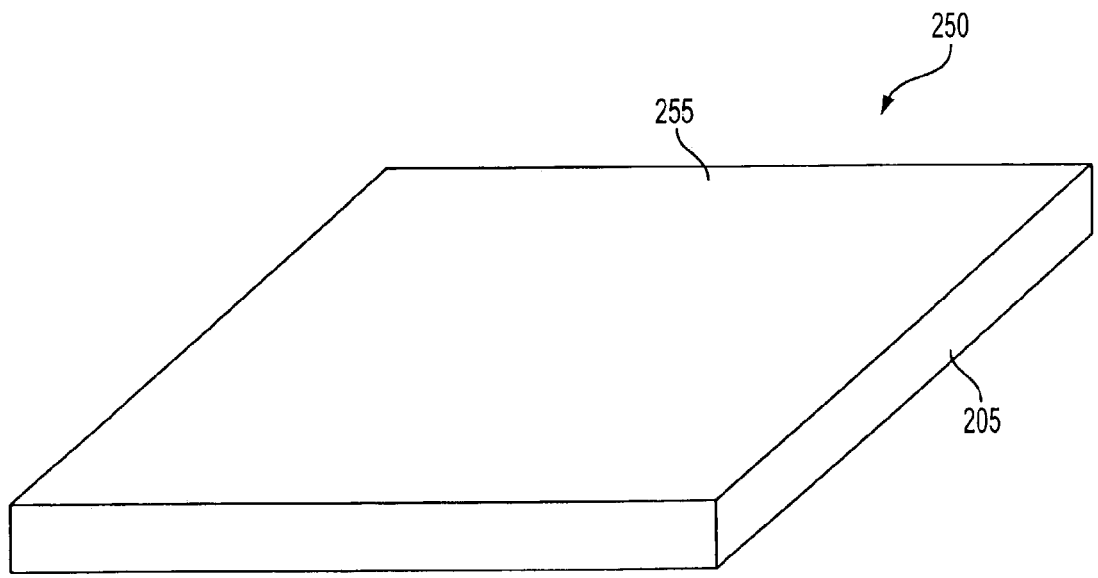
FIG. 2B shows an exemplary shelf with an embedded RF-ID system.

With reference to FIGS. 2A-2B, during operation, the rectangular shelf housing 205 is covered by cover 255 to form a shelf 250 that contains the RF-ID system 107 and on which items may be placed. The number of antenna boards 125, the number of slave readers 115, the number of inductor coils 210 per board, and the grid spacing may vary depending on the size of the shelf and the desired detection granularity.

The computer 105 may be implemented by, for example, a general-purpose computer capable of responding to and executing instructions in a defined manner, a personal computer, a special-purpose computer, a workstation, a server, a processor, a device, a component, or other equipment or some combination thereof capable of responding to and executing instructions. The computer 105 may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the computer 105. The computer 105 may be external to the shelf 250 and may interface with the master reader MPU 110 of the RF-ID system 107 using, for example, a serial, an Ethernet, a wireless (e.g., Bluetooth™) or an IP-based connection. Alternatively, the computer 105 may be embedded in the shelf 250. The computer 105 also may interface with multiple master reader MPUs 110 of RF-ID systems 107 embedded in multiple shelves 250 (i.e., one computer 105 may monitor the item movements on multiple shelves 250).

Figure 3:
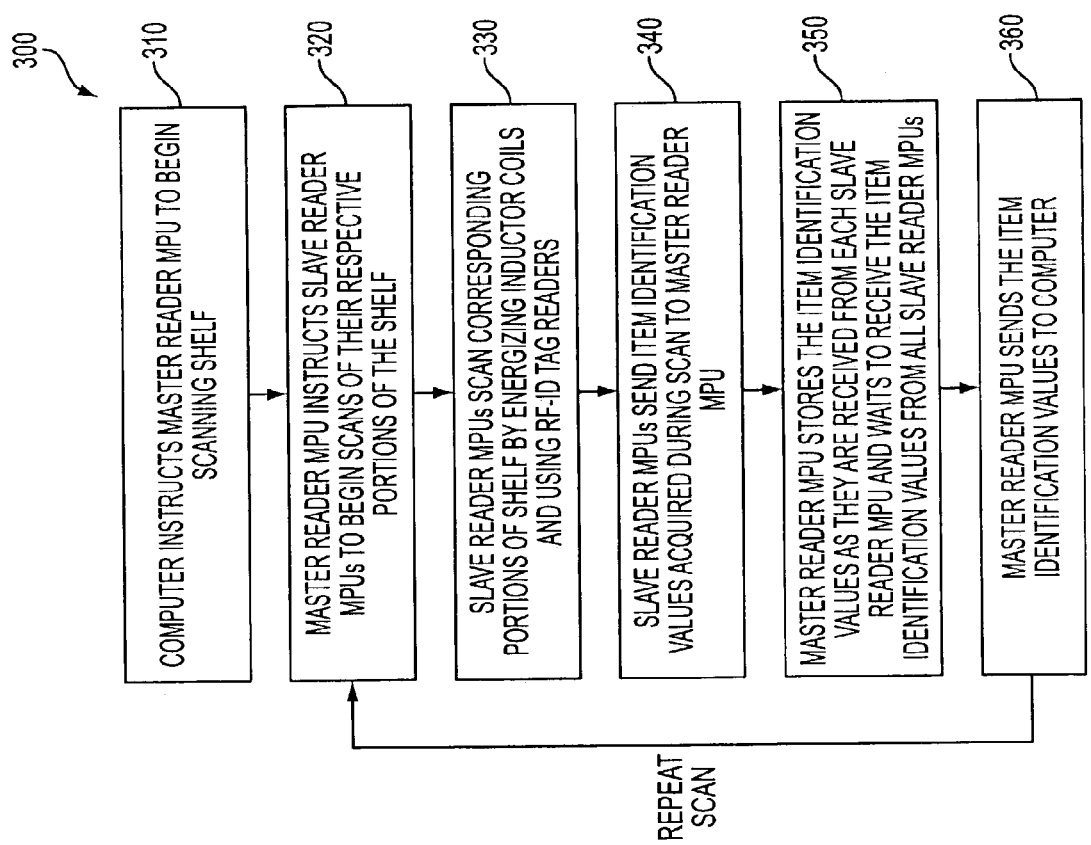
FIG. 3 shows a flow diagram of a process for detecting items using the item identification system of FIG. 1.

FIG. 3 shows a process 300 for detecting items placed on the shelf 250. For convenience, the process shown in FIG. 3 references particular elements described with respect to FIG. 1. However, similar methodologies may be applied in other implementations where different elements are used to define the structure of the system, or where the functionality is distributed differently among the elements shown by FIG. 1. Each item is labeled with a unique RF-ID tag prior to being placed on the shelf 250.

The computer 105 instructs the master reader MPU 110 to start scanning the shelf (310). The master reader MPU 110 instructs the slave reader MPUs 115 to begin scans of their respective portions of the shelf (320). Each slave reader MPU 115 scans its portion of the shelf 250 (i.e, two of the six boards) in an orderly fashion coordinated by the master reader MPU 110 (330). The slave reader MPUs 115 scan their portion of the shelf 250 by energizing the inductor coils 210, thereby generating a magnetic field that activates the RF-ID tag. Each RF-ID tag associated with an item modulates the magnetic field uniquely in accordance with its embedded item identifier. The modulation of the magnetic field by the RF-ID tag is detected by the RF-ID tag reader 120. The RF-ID tag reader 120 extracts an identification value for the item from the modulated signal and sends that value to the slave reader MPU 115. The slave reader MPU 115 stores identification values for all items that it detects during its scan and, upon completion of its scan, sends the identification values to the master reader MPU 110 (340).

The master reader MPU 110 stores the identification values received from the slave reader MPU 115 and waits to receive identification values from the rest of the slave reader MPUs 115 (350). Once all identification values are received by the master reader MPU 110 from all slave reader MPUs 115 for a given scan, the master reader MPU 110 sends the identification values to the computer 105 and tells the slave reader MPUs 115 to begin another scan of the shelf 250 (360). The computer 105 may instruct the master reader MPU 110 to stop the scanning process at any time, or alternatively, may only instruct the master reader MPU 110 to stop the scanning process after completion of a scan and before commencement of another scan.

The computer 105 stores and processes the item identification values for the shelf 250 to provide useful information to a user regarding the items currently on the shelf (e.g., the location and change of items currently on the shelf). Since the identification values may be continuously received by the computer 105 from the RF-ID system 107 (e.g., one every few seconds), the computer 105 or any system or device communicating with the computer 105 may be provided with real-time or near real-time updates of item location and movement on the shelf. Real-time updates in this case are defined as an update every few seconds. The ability to provide item location and movement information in real-time may be particularly useful for supply chain management (SCM) applications. The operation and implementation of the shelf 250 are discussed in more detail below with respect to FIGS. 4-6. The use of the shelf in supply chain management applications to monitor item location and movement in nodes of a supply chain (e.g., retailer, warehouse, manufacturer, and distribution center) is discussed in more detail below with respect to FIGS. 7-10.

Figure 4:
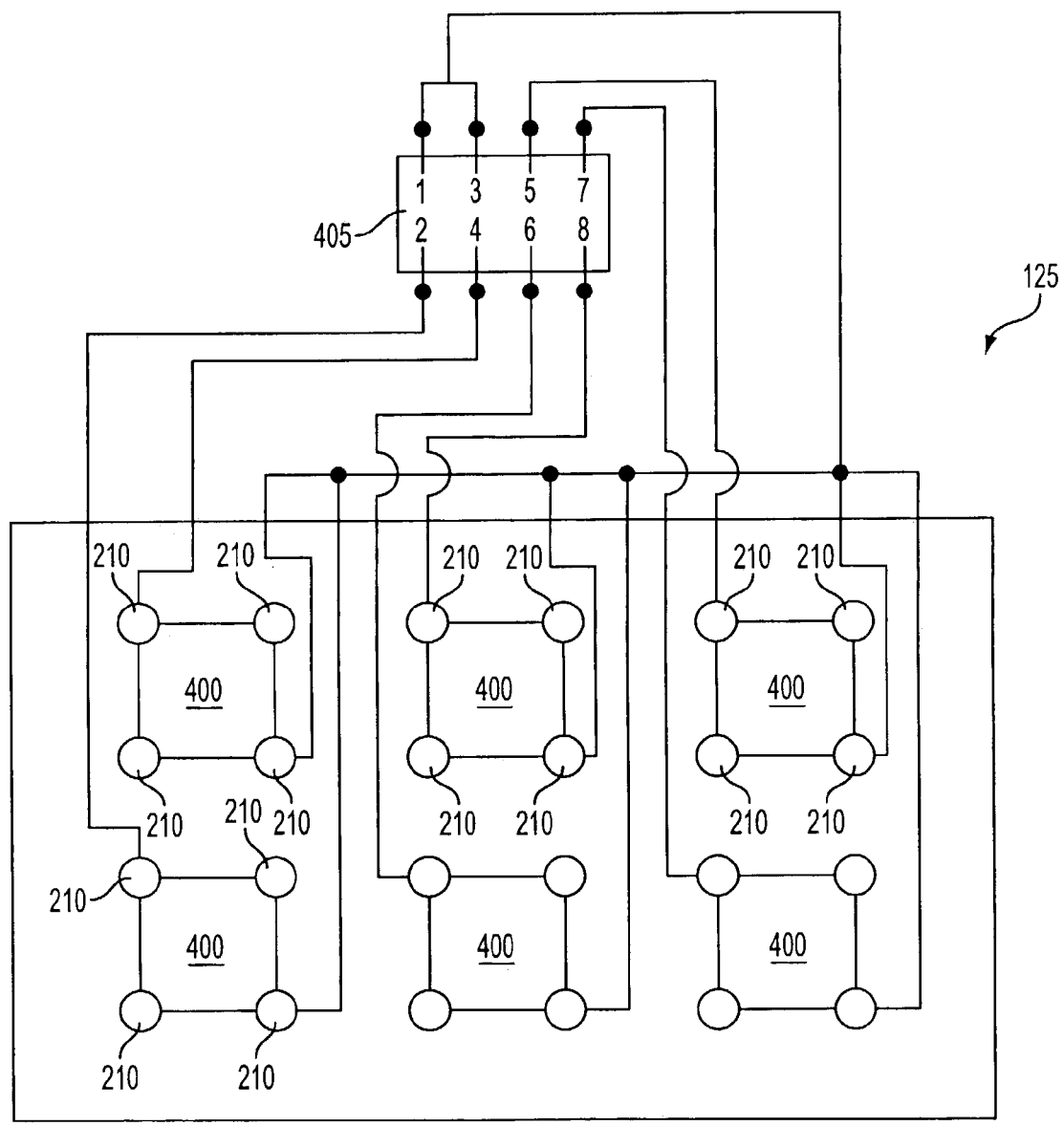
FIG. 4 shows an exemplary antenna board used to detect items placed on the shelf.

FIG. 4 is an exemplary circuit diagram of the antenna boards 125 with the twenty-four inductor coils 210 spaced on the board in a 4×6 grid. The twenty-four inductor coils 210 are divided up into six groups of four inductor coils 400, each group of four forming a square on the board 125. The four inductor coils of each group 400 are divided into two pairs of inductor coils connected in parallel. Each pair comprising two inductor coils connected in series. The entire group 400 is connected to connector 405.

Figure 5A:
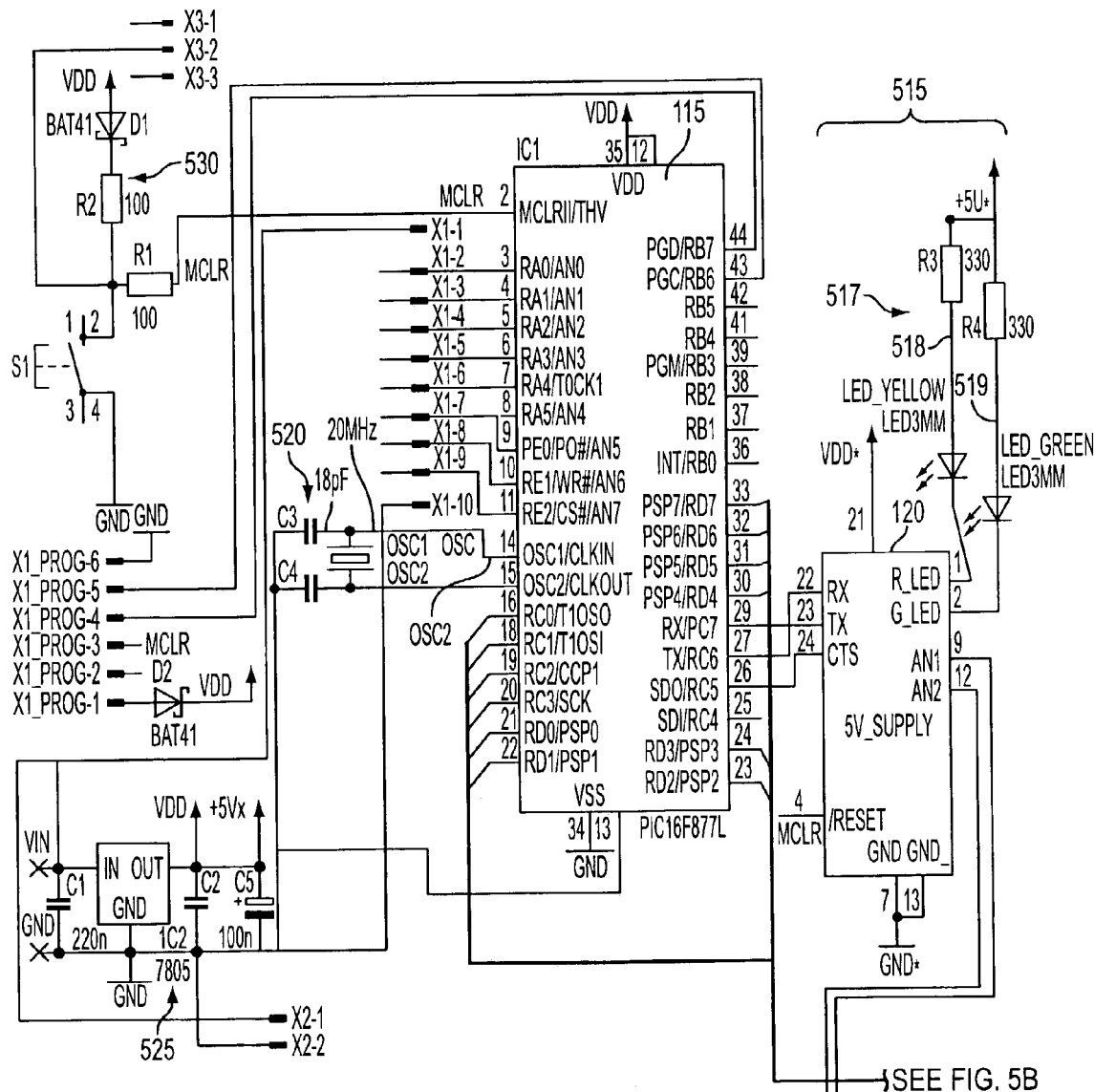
FIGS. 5A and 5B show a circuit diagram of a slave reader microprocessing unit circuit board.
Figure 5B:
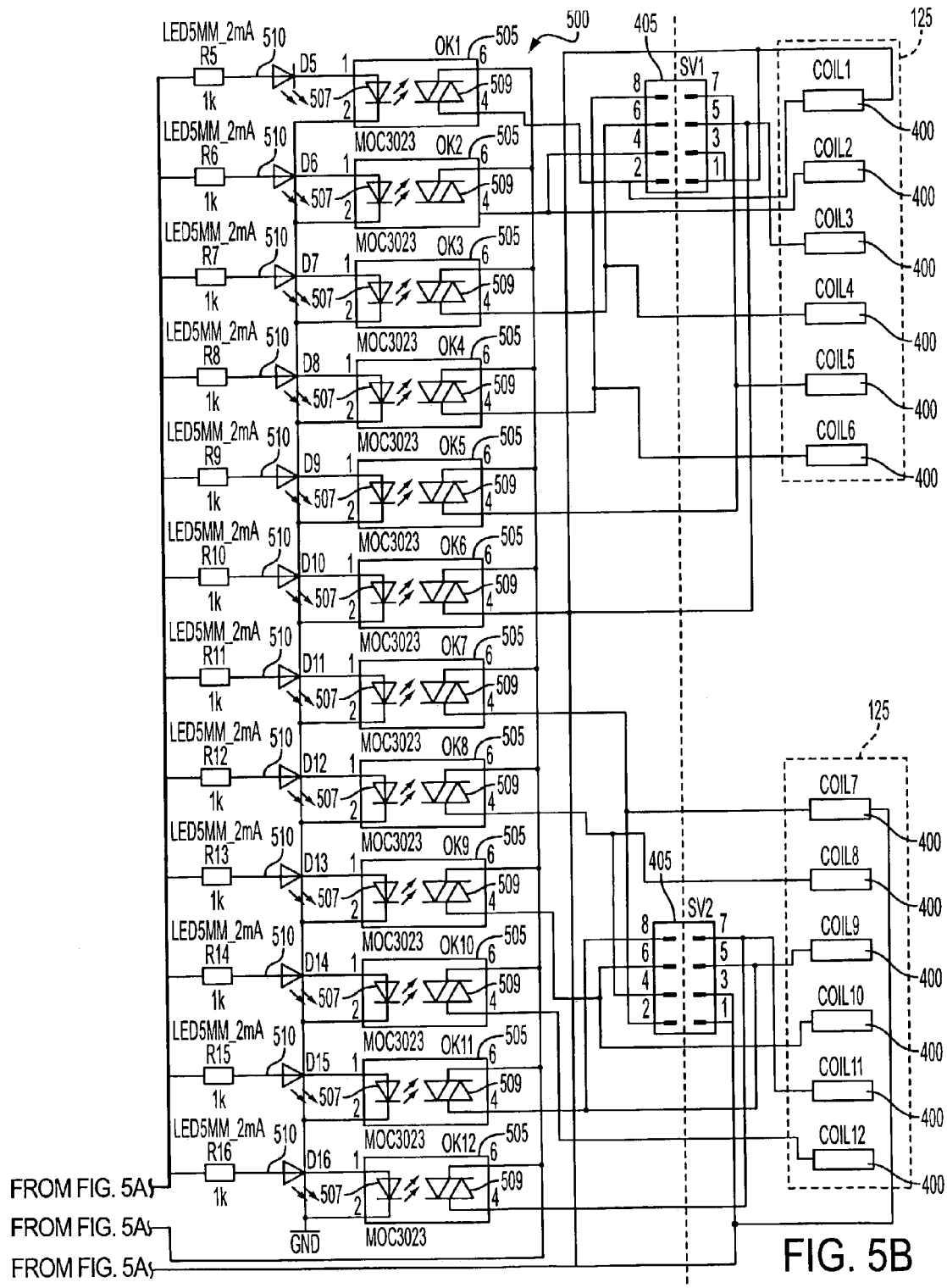

FIGS. 5A and 5B shows an exemplary circuit diagram for a slave reader circuit board 500. The circuit board 500 includes two connectors 405 connected to twelve optical bidirectional switches 505 which are connected to twelve light-emitting diode (LED) circuits 510, an RF-ID tag reader circuit 515, the slave reader MPU 115, a clock generation circuit 520, a power converter circuit 525, and a reset switch circuit 530. The two connectors 405 connect the circuit board 500 to the groups of four inductor coils 400 on two antenna boards 125.

Each connector 405 is an eight pin connector. Two of the eight pins of each connector 405 are used to connect the six groups of four coils 400 to a common signal. The other six pins of each connector 405 are used to connect the six groups of four inductor coils 400 to six optical bidirectional switches 505 on the circuit board 500. Therefore, the circuit board 500 handles a total of twelve groups of four inductor coils 400 located on two antenna boards 125. Note that the circuit diagram of FIGS. 5A and 5B show a single coil instance for each group of four inductor coils 400 for simplicity. The control side 507 of each optical bidirectional switch receives a signal from the slave reader MPU 115 via one of the LED circuits 510. Depending on the signal at the control side 507, the switching side 509 of each bidirectional switch 505 either enables or disables the connection between one of the groups of four inductor coils 400 and the input pin AN1 of the RF-ID tag reader 515. The optical bidirectional switches 505 should be able to handle the high voltage and high frequency signals (e.g., frequencies up to 125 kHz and voltages up to 250V) necessary to activate and read the RF-ID tags of the items placed on the shelf 250. The optical bidirectional switches 505 may be implemented using, for example, a form of solid state relay such as an LH1540.

When the slave reader MPU 115 sends, for example, a high potential signal to a given optical bidirectional switch 505, the switch 505 establishes a connection between one of the groups of four inductor coils 400 and the AN1 pin of the RF-ID tag reader 515. As discussed in more detail below, this energizes the group of coils 400 and allows the tag reader 515 to detect items on the shelf 250 near the energized group of coils 400. When the slave reader MPU 115 sends a low potential signal to a given optical bidirectional switch 505, the switch 505 severs the connection between the group 400 and the AN1 pin of the RF-ID tag reader 515. This deactivates the group of coils 400, preventing the group from being used to detect items on the shelf 250.

Additionally, magnetic field strength regulators (not shown) may be used to supplement the bi-directional switches 505. Magnetic field strength regulators strengthen or weaken the magnetic field generated by the groups of coils 400 in response to control signals from the slave reader MPU 115. The field strength regulators may include a programmable circuit electrically connected to connectors 405 that may be used to switch different capacitors or resistors in series or in parallel in order to vary the magnetic field strength of the groups of coils 400.

The regulation of the magnetic fields gives the shelf the ability to adapt dynamically to detect larger and smaller items. Detection of larger items (e.g., cereal boxes) on the shelf may require generation of a stronger magnetic field due to the possibly higher distance of the larger item's RF-ID tag from the surface of the shelf 250. Such a strong magnetic field, however, is undesirable when detecting the RF-ID tags of smaller items (e.g., lipstick) because of the likelihood that the smaller item will be detected multiple times by different groups of coils 400 due to the larger magnetic field and, hence, larger detection radius of each group of coils 400. Dynamically regulating the strength of the magnetic field in localized portions of the shelf as necessary for detection of larger and smaller items may enhance the item detection capabilities of the shelf 250.

The twelve LED circuits 510 connect each of twelve line control output pins 517 of the slave reader MPU 115 to the control side 507 of a corresponding optical bidirectional switch 505. The LED circuits 510 may include a resistor and an LED connected in series. The LED lights when the slave reader MPU 115 sends, for example, a high potential signal to activate the given bidirectional switch 505. The LED informs the user that the corresponding group of four coils 400 on the antenna board 125 connected to that switch 505 is active and detecting items on the shelf 250. The LED also serves to limit the current draw from the output pins 517 of the slave reader MPU 115. For example, the current draw may be limited by the diode to 2 mA so that the maximum current draw from the slave reader MPU 115 is 24 mA if all twelve switches 515 are active simultaneously. The LEDs are used to diagnose the operation of the board 500. Diodes may replace the LEDs if such diagnosis is not desired.

The RF-ID tag reader circuit 515 includes the RF-ID tag reader 120 and LED status circuits 517. Pins RX, TX, and CTS of the RF-ID tag reader 120 are connected to the slave reader MPU 115. Pin AN1 of the RF-ID tag reader 120 is connected to the twelve groups of four coils 400 on the two antenna boards 125 via the switching sides 509 of the twelve bidirectional switches 505. Pin AN2 is connected to the common signal of the groups of four coils 400.

When the RF-ID tag reader 120 receives a request for an RF-ID tag from the slave reader MPU 115 via the RX pin, the tag reader 120 energizes pin AN1. In this exemplary circuit, prior to the MPU 115 requesting that a tag be read, the MPU 115 activates one of the bidirectional switches 505 by sending a high potential signal to the control side 507 of the switch. Thus, only one of the twelve groups of four coils 400 is energized by the tag reader via pin AN1 at a given time. The energized group of four coils 400 generates a magnetic field that activates any RF-ID tags of items placed on the shelf 250 on or near the square formed by the group of four coils 400.

Active RF-ID tags modulate the magnetic field created by the energized group of four coils 400 and thereby cause modulation of the signal received by the RF-ID tag reader 120 via pin AN1. This signal modulation is detected by the RF-ID tag reader 120 and is converted to a unique item identification value corresponding to the RF-ID tag of the item. In this example, the identification value for the item is a five byte value that is serially transferred to the slave reader MPU 115 via pin TX of the RF-ID tag reader 120.

The RF-ID tag reader 120 may take up to 200 milliseconds to read the RF-ID tag of an item depending on the distance of the tag from the shelf 250 and any environmental noise in the vicinity of the item. The tag reader 120 sends a signal via the CTS pin to inform the MPU 115 when the tag reader 120 is busy reading tag ID data and when the tag reader 120 is ready for another tag reading request from the slave reader MPU 115.

The LED status circuits 517 are used in a similar fashion to inform the user of when the tag reader 120 is reading tag data and when it is not. The LED status circuits 517 include an active status circuit 518 comprising a green LED connected in series with a resistor and an inactive status circuit 519 comprising a yellow LED connected in series with a resistor. The green LED lights when the tag reader 120 is in the process of reading a tag. The yellow LED lights when the tag reader 120 is not reading a tag. The LED status circuits 517 are used for diagnostic purposes and may be omitted.

The slave reader MPU 115 is connected to the master reader MPU 110 (FIG. 1), the control sides 509 of the twelve optical bidirectional switches 505, the tag reader 120, the clock generation circuit 520, the power converter circuit 525, and the reset switch circuit 530. The slave reader MPU 115 may be an embedded microprocessing unit with a small central processing unit, program memory that may be erased and reprogrammed, and enhanced input/output capabilities that allow the designer to access and configure each input/output pin separately (i.e., the designer may designate some pins as receiving inputs, others as driving outputs, and may use or not use pins as desired.) The slave reader MPU 115 may be, for example, a PIC 16F877 processor manufactured by Arizona Microchip.

In this exemplary circuit, the slave reader MPU 115 is programmed to wait for a start signal from the master reader MPU 110 that informs the slave reader MPU 115 that it should commence a scan of the groups of coils 400 in the two antenna boards 125 (i.e., operation 320). The slave reader MPU 115 communicates with the master reader MPU 110 via pins RA0 to RA4 and pins RE0 to RE2. The slave reader MPU 115 may be programmed using pins PGD and PGC.

When the slave reader MPU 115 receives the start signal from the master reader 110, the slave reader MPU 115 begins a scan of the twelve groups of four coils 400 one group at a time (operation 330). The slave reader MPU 115 turns on one of the bidirectional switches 505 by placing a high potential signal on an output pin connected to the control side 509 of the switch 505 via the corresponding LED circuit 510. When the switch 505 is turned on, the RF-ID tag reader 120 is connected to one of the groups of four coils 400. The slave reader MPU 115 then requests an item identification value from the RF-ID tag reader 120 and waits to receive the item identification value. The RF-ID tag reader 120 sends status bytes that acknowledge the request and inform the slave reader MPU 115 whether or not the reading was successful or unsuccessful (i.e., no RF-ID tag was detected).

Once the item identification value is received by the slave reader MPU 115, the value is stored in the memory of the slave reader MPU 115. The slave reader MPU 115 turns off the bidirectional switch 505 and turns on the next bidirectional switch 505 corresponding to the next group of four coils 400. The process then begins again and repeats until all twelve groups of four coils 400 are scanned and item identification values corresponding to each group are stored in the memory of the slave reader MPU 115.

Once the slave reader MPU 115 has completed its scan and stored all of the item identification values in memory, the slave reader MPU 115 informs the master reader MPU 110 that the scan is complete and that the slave reader MPU 115 is ready to transfer the item identification values to the master reader MPU 110. When the master reader MPU 110 is ready to accept the item identification values, it informs the slave reader MPU 115 and receives the values via the communication pins RA0 to RA4 and RE0 to RE2 (i.e., operation 340). When the transfer is complete, the slave reader MPU 115 is ready to commence another scan upon receiving another start signal from the master reader MPU 115.

The sequential scanning of the groups of four coils 400 described above is illustrative and is not meant to be limiting as to the scanning technique employed by the slave reader MPU 115. Other nonsequential scanning techniques in which the order or the number of groups scanned at a given time also may be used.

The time it takes for a slave reader MPU 110 to complete its scan depends on the number of items detected in the portion of the shelf 250 monitored by that slave reader MPU 110, the distance of the RF-ID tags of those items from the shelf 250, and the noise in the vicinity of the items. For example, the scan time may vary from 100 milliseconds to 2.5 seconds.

The clock generation circuit 520 is a standard clock generation circuit composed of an oscillating crystal and two capacitors. The clock signal is received by the slave reader MPU 115 using pins OSC1 and OSC2. The clock signal may, for example, have a 20 MHz frequency.

The power converter circuit 525 is a standard power converter circuit used to convert an input power voltage signal of varying voltage to a power voltage signal of five volts. In this example, the input power voltage signal may vary from seven volts to twenty-five volts. The capacitors in the circuit 525 are included to eliminate any noise in the power supply signal.

The reset switch circuit 505 includes a reset switch, two resistors, and a zener diode. The reset switch circuit 505 is connected to an MCLR pin of the slave reader MPU 115. When the reset switch is flipped, the MCLR pin is pulled to ground and the slave reader MPU 115 is reset. Resetting the MPU 115 by flipping the reset switch places the slave reader MPU 115 into its initial state. The slave reader MPU 115 stays in the initial state until it receives the start signal from the master reader MPU 110. The zener diode is used to protect the MCLR pin from a voltage overload caused by connection of the MCLR pin to external pin X3-2 of the circuit board 500.

Figure 6A:
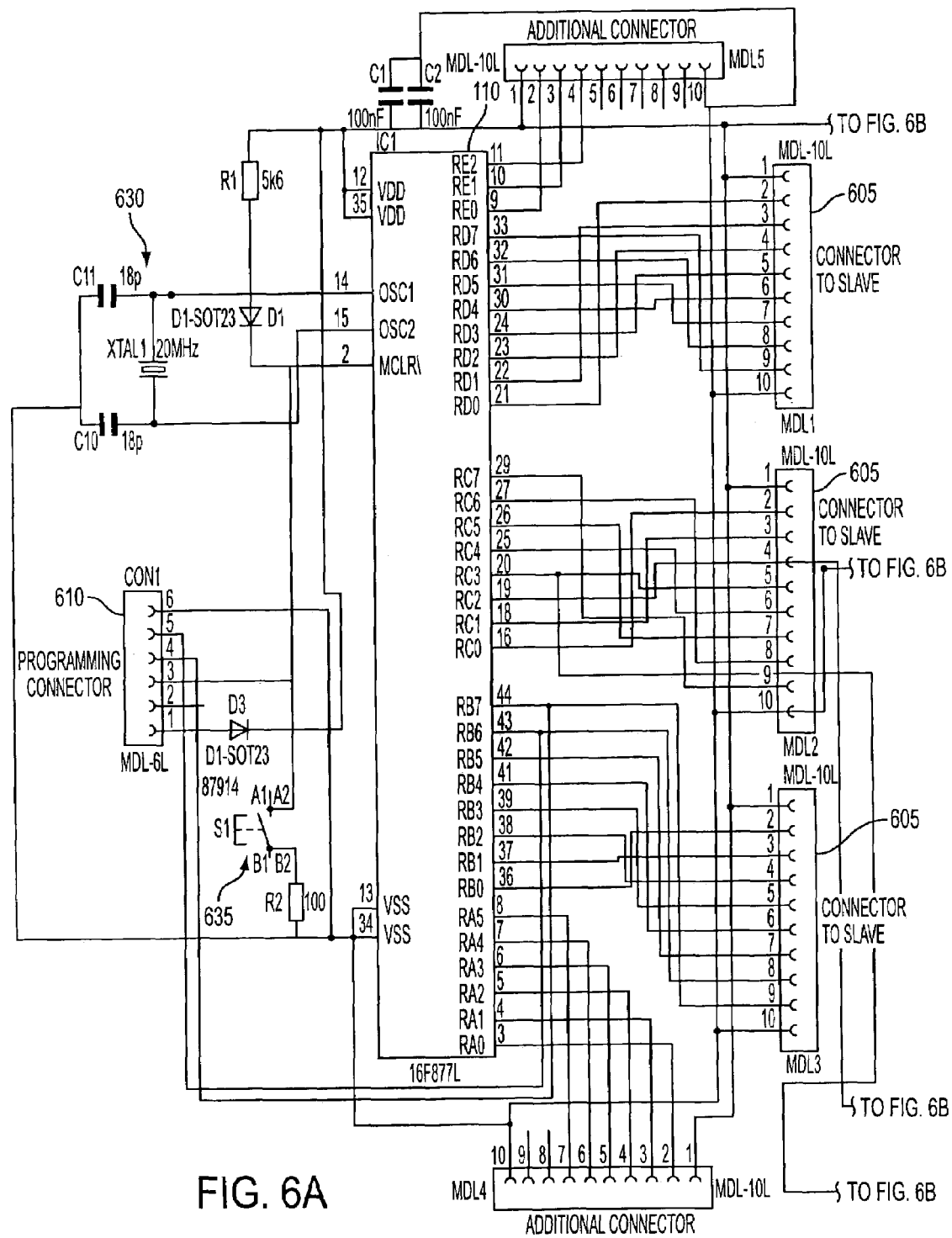
FIGS. 6A and 6B show a circuit diagram of a master reader microprocessing unit circuit board.
Figure 6B:
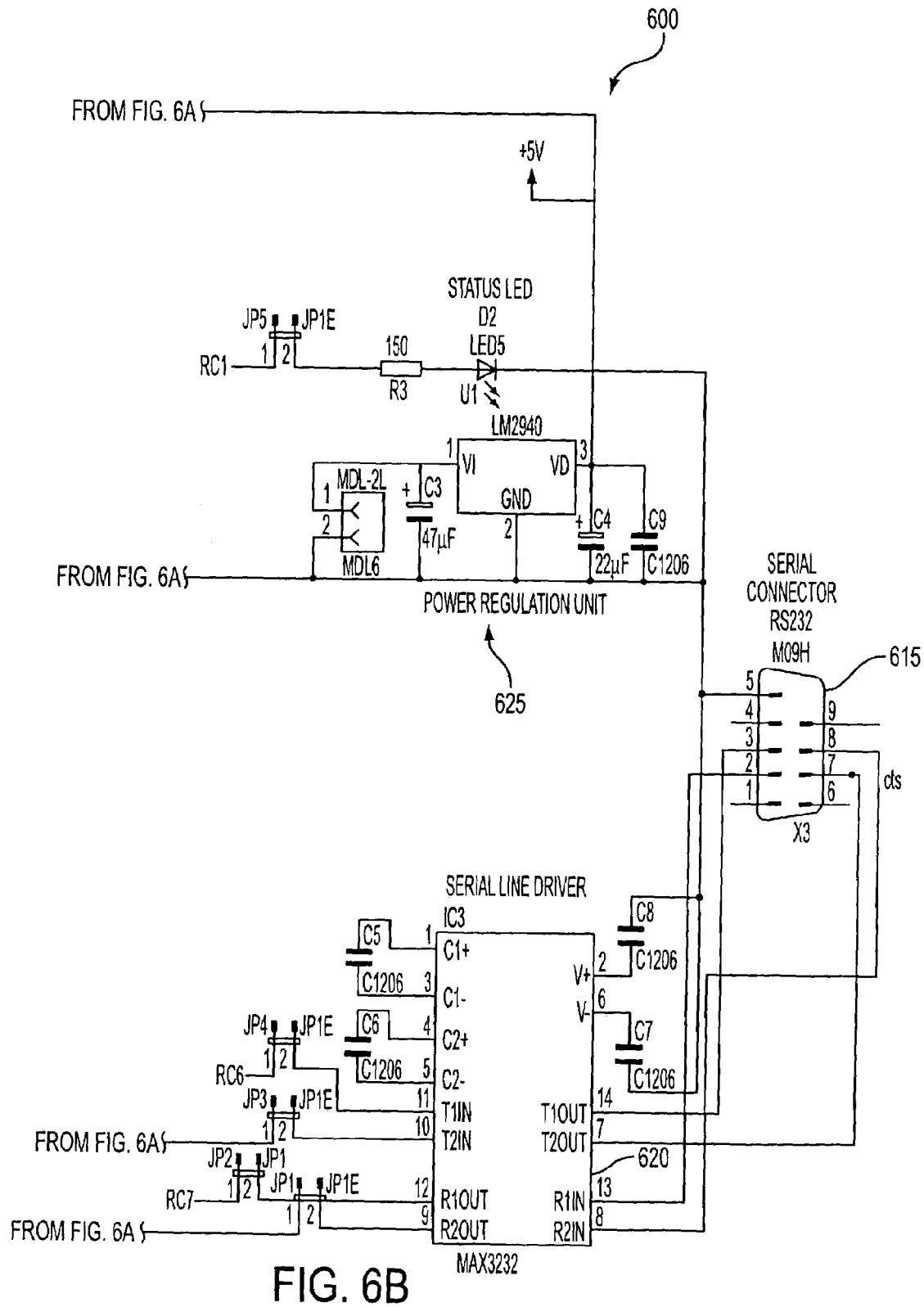

FIGS. 6A and 6B shows an exemplary circuit diagram for a master reader circuit board 600. The circuit board 600 includes three slave reader MPU connectors 605 connected to the master reader MPU 110, a programming connector 610 connected to the master reader MPU 110, a serial connector 615 connected to a serial line driver 620 that is, in turn, connected to the master reader MPU 110, a power regulation circuit 625, a clock generation circuit 630, and a reset switch circuit 635.

The master reader MPU 110 is a processor similar in characteristics to the slave reader MPU 115. Specifically, the master reader MPU 110 may be a processor with 250 bytes of RAM, 8 Kb of flash memory, 60 bytes EEPROM, 200 ns instruction cycle, 16 bit timer with prescaler and freely programmable communication pins. The master reader MPU 110 may be, for example, a 16F877L processor manufactured by Arizona Microchip.

The master reader MPU 110 communicates with each slave reader MPU 115 via the connectors 605. In this exemplary circuit, pins RD0 to RD7 connect to pins RA0 to RA4 and pins RE0 to RE2 of the first slave reader MPU 115. Pins RC0 to RC7 connect to pins RA0 to RA4 and pins RE0 to RE2 of the second slave reader MPU 115. Pins RB0 to RB7 connect to pins RA0 to RA4 and pins RE0 to RE2 of the third slave reader MPU 115.

During operation, the master reader MPU 110 may receive instructions from the computer 105 to begin a scan of the shelf 250 (i.e., operation 310). In the exemplary circuit 600, the instructions are received by the master reader MPU 110 via the serial connector 615 and serial line driver 620. Upon receiving the instructions, the master reader MPU 110 sends a start signal to the three slave reader MPUs 115 to inform the slave reader MPUs 115 to start a scan of their respective portions of the shelf 250 (i.e., operation 320). The master reader MPU 110 waits until one of the slave reader MPUs 115 sends back a ready signal informing the master reader MPU 110 that the slave reader MPU 115 has completed its scan and is ready to transmit identification values of detected items.

When the master reader MPU 110 receives the ready signal from a slave reader MPU 115, it sends back an acknowledgement signal and begins receiving item identification values from the slave reader MPU 115 and storing these values in a memory. The master MPU 110 reads the identification values from the slave reader MPUs 115 on a first-come first-served basis. If one of the other slave reader MPUs 115 sends a ready signal while the master reader MPU 115 is still in the process of storing identification values, the master reader MPU 115 does not send an acknowledgement signal, and the slave reader MPU 110 must wait.

Once the master reader MPU 110 has received and stored all of the identification values from the slave reader MPUs 115 (i.e., operation 350), the master reader MPU 110 sends the data to the computer 105 (i.e., operation 360). In this exemplary circuit, the master reader MPU 110 then commences another scan by sending another start signal to the three slave reader MPUs 115. The memory embedded within the master reader MPU 110 may be erased and written over by the identification values corresponding to the new scan, and the process begins all over again.

The computer 105 may process the identification values of the items received by the master reader MPU 110 to track the movement of items to and from the shelf 250. Furthermore, the computer 105 also may handle any processing involved in cleaning up the values (e.g., eliminating multiple detections of the same item by multiple coils) in order to localize the different items on the shelf and determine their geometry.

The computer 105 may be implemented using a server that interfaces with multiple shelves 250 via an IP or Ethernet-based connection that communicates over a long range wireless or short range wireless (e.g., Bluetooth™) channel. A website may serve as a user interface to a program that processes identification values for items detected on multiple shelves.

The item identification system 100 may be employed in supply chain management systems to keep track of items that are placed on shelves. For example, the computer 105 of the item identification system 100 may implement a shelf watch application that processes item identification values received from one or more master reader MPUs 110 to allow a user or other entity to monitor and keep track of the location and movement of items on one or more shelves similar to shelf 250. The monitoring and tracking of item movements to and from shelves is also of particular value for retail store management (e.g., plan-o-gram compliance and out-of-stock warnings).

Figure 7:
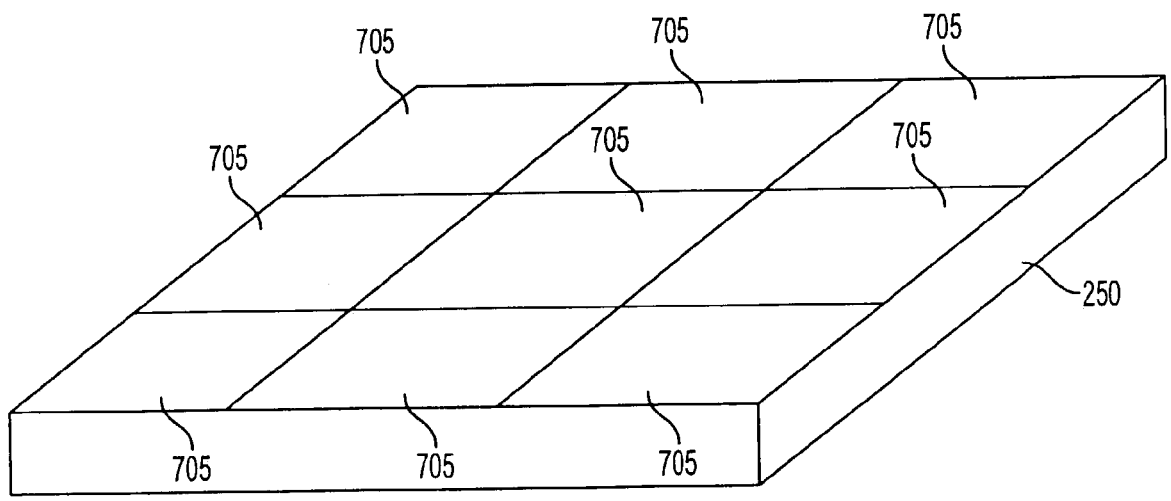
FIG. 7 shows an exemplary shelf with an embedded RF-ID system.

Referring to FIG. 7, an implementation of the item identification system 100 directed to supply chain management includes the computer 105 running a shelf watch application to detect and monitor item placement on a shelf 250 consisting of nine equal-sized portions 705. The shelf watch application processes and distributes the item identification values received from the master reader MPU 110 to identify item placement in each of the nine shelf portions 705. The shelf watch application may be a program, a piece of code, a device, a computer, a computer system, or combination thereof, which independently or collectively direct operations, as described herein. The shelf watch application may be embodied permanently or temporarily in any type of machine, component, equipment, storage medium, or propagated signal that is capable of being delivered to the computer 105.

The shelf watch application processes the identification data received by the computer 105 from the master reader MPU 110. If the computer 105 receives a five byte identification value per scan from each group of coils 400, the computer 105 receives a total of 180 bytes of identification data per scan of shelf 250 (i.e., 5 bytes of data per scan per group of coils×12 groups of coils per slave reader MPU×3 slave reader MPUs per shelf=180 bytes of data per scan per shelf). Item placement in each portion 705 may be detected by four adjacent groups of coils 400, each providing five bytes of identification data. The resulting 20 bytes of item identification data provided by the four groups of coils 400 are analyzed by the shelf watch application to determine whether an item has been placed on the corresponding shelf portion 705 and, if so, the identity of the item. The use of multiple groups of coils 400 to detect a given item provides redundancy that improves the accuracy of item identification.

The 20 bytes of identification data may be deciphered by the shelf watch application to determine the location of the item and other information associated with the item. The 20 bytes of identification data may be associated with the item location by, for example, the position of the 20 bytes of data within the byte stream received from the master reader MPU 110 (e.g., the first 20 bytes may correspond to the four groups of coils in the upper left corner of the shelf and the last 20 bytes may correspond to the four groups of coils in the lower right corner of the shelf). The 20 bytes of data include an item identifier (ID). The item ID may include or be linked to information associated with the item such as, for example, an individual item name (e.g., 417298-61), an item product name (e.g., All About Eve Perfume), and an item manufacturer name (e.g., JOOP!). In some implementations, the item ID is used as an index to access item information stored as an array of values, a dynamic list, or in another way. The item information may be stored locally to the computer 105, remotely in a single device, or distributed across several devices.

Figure 8:
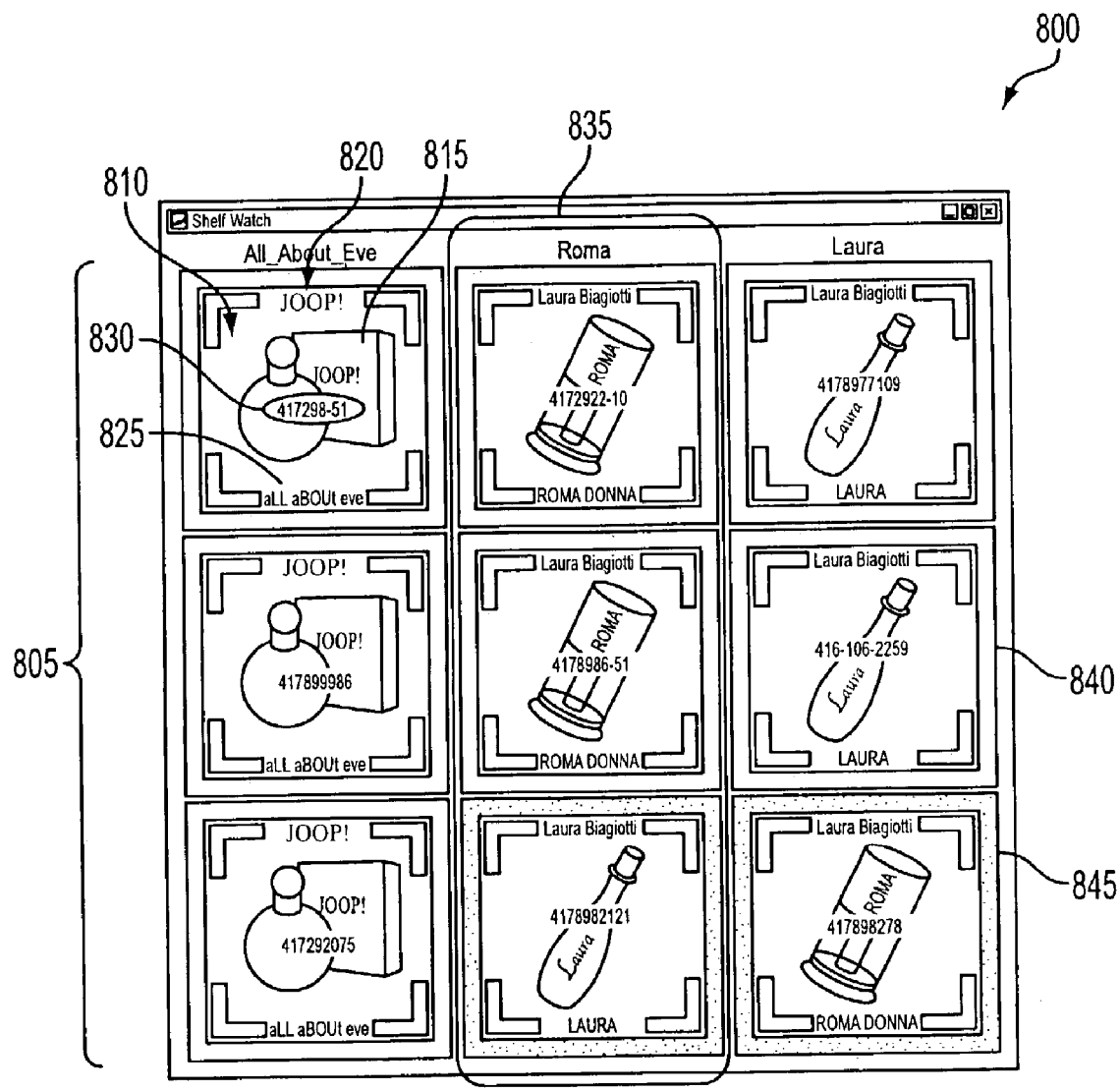
FIG. 8 shows a user interface for a shelf watch application that detects item placement and position on a shelf.

FIG. 8 shows a user interface 800 for the shelf watch application that detects item placement and position on the nine equal-sized portions 705 of the shelf 250. The user interface 800 may display a graphical representation 805 of the shelf 250 that represents each portion 705 by a corresponding box 810. In this example, the boxes 810 may include a graphical icon 815 that illustrates the item, if any, located on the corresponding portion 705 of the shelf 250. If no item is currently located on the portion 705, the box 810 may be colored gray and may display an "empty" message.

The boxes 810 also may include a display 820 of the item manufacturer name, a display 825 of the item product name, and a display 830 of the individual item name. The box 810 may additionally or alternatively display other information associated with the item and accessible to the shelf watch application via the identification data collected by the shelf 250 for the corresponding portion 705. In other implementations, multiple items with the same product name and produced by the same manufacturer may be placed on each portion 705, and a display of the number of items located on each portion 705 may be included in each corresponding box 810.

If the shelf watch application is unable to identify some or all parts of the identification data of an item placed on a portion 705 of the shelf 250, the relevant displays in the corresponding box 810 may be whited out and replaced by an "unknown" message. For example, if the individual item name and the item product name are not recognized, displays 825 and 830 in the box 810 corresponding to the relevant portion 705 may be replaced by the word "unknown." The graphical icon 815 also may be whited out. The display 820 of the item manufacturer name, however, still may be optionally displayed.

Different portions 705 of the shelf 250 may be assigned to carry a particular type of item. For example, the middle three portions 705 of the shelf 250 may be assigned to carry Roma Donna perfumes manufactured by Laura Biagiotti. The middle three portions 705 of the shelf 250 correspond to the middle column 835 of boxes 810 in the display 805. The middle column 835 may be identified by a column label 840 that relates to the type of items assigned to that part of the shelf 250. In this example, the column label is "Roma" to indicate that the type of items that are assigned to the middle three portions 705 of the shelf 250 are Roma Donna perfumes. The remaining columns are labeled "All_About_Eve" and "Laura" to indicate that the type of items that are assigned to the corresponding portions 705 of the shelf 250 are All About Eve perfumes and Laura perfumes, respectively. In other implementations, different numbers of boxes 810 may be assigned to different item types (e.g., one box 810 is assigned to one item type) and may be labeled accordingly (e.g., a label relating to the assigned item type may be placed on top of each box 810). The shelf watch application may access shelf assignment data stored locally in the computer 105 (e.g., in a configuration file in ASCII text format), remotely in a single device, or distributed across several devices. The shelf assignment data may be stored as an array of values, an index, a dynamic list, or in another way.

The shelf watch application may determine whether items are placed in accordance with the shelf assignment data by comparing the shelf assignment data with the item location data received from the master reader MPU 110. The shelf watch application may subsequently inform the user of correct or incorrect item placement. For example, the shelf watch application may graphically inform the user of correct item placement by displaying a light border 840 around boxes 810 corresponding to portions 705 containing items correctly placed. The shelf watch application may graphically inform the user of incorrect item placement by displaying a dark border 845 around boxes 810 corresponding to portions 705 containing items incorrectly placed. In the example shown in FIG. 8, one Laura perfume is incorrectly placed in the part of the shelf assigned to Roma Donna perfumes, and one Roma Donna perfume is incorrectly placed in the part of the shelf assigned to Laura perfumes.

The graphical representation of the shelf 805 may be updated in real time to reflect the current placement of items on the shelf 250. In this example, the master reader MPU 110 sends 180 bytes of item identification data to the computer 105 for each scan of the shelf 250. Since a scan takes at most a few seconds (e.g., 200 milliseconds-2.5 seconds), the shelf watch application may update the graphical representation 805 of the shelf every few seconds to reflect the current placement of items on the shelf 250.

While division of the shelf 250 into nine portions is presented in this example, the shelf 250 may be divided into more or less portions of different sizes by modifying the way the shelf watch application segments and analyzes the item identification data received from the master reader MPU 110. For example, the shelf 250 may be divided into seven portions by collapsing three of the adjacent shelf portions 705 into a new and larger shelf portion (i.e., segment and analyze six 20 byte portions, each corresponding to four groups of coils 400, and one 60 byte portion corresponding to twelve groups of coils 400). The shelf portions 705 also may be subdivided further by changing the number of groups of coils 400 per portion (e.g., segment and analyze 25 five byte portions, each corresponding to one group of coils 400, and two 30 byte portions, each corresponding to six groups of coils 400). Furthermore, the number of groups of coils 400, the number of master reader MPUs 110, the number of slave reader MPUs 115, and the grid spacing between groups of coils 400 may vary depending on the size of the shelf and the desired detection granularity.

The shelf watch application may be of particular use in retail stores or warehouses to keep track of inventory in real time. For example, the shelf watch application may receive item identification data from multiple shelves of varying size throughout the store or warehouse. The item identification data may be processed by the shelf watch application to keep track of the items placed on the multiple shelves in a similar manner as that described above with respect to FIGS. 7 and 8. Item inventory may be tracked by, for example, totaling the number of items placed on all of the store shelves corresponding to each item product name and to each item manufacturer name. When the number of items of a given type (i.e., of a given product name and/or manufacturer name) decreases below a predetermined threshold, the shelf watch application may send out a message indicating that more of this type of item need to be ordered. In some implementations the shelf watch application may be combined with a pick-to-light system to facilitate restocking of inventory. For example the pick-to-light system may receive the out-of-stock messages generated by the shelf watch application and illuminate a light or activate an indicator associated with the shelf or location on which the out-of-stock items are normally placed (e.g., a light positioned in close proximity to the shelf may be illuminated). The light may be used, for example, to indicate to an employee which items are out-of-stock and where to replace or restock items received in a shipment.

The shelf watch application also may be used to optimize or improve the placement of items on warehouse and retail store shelves by tracking patterns of item movement. By changing item assignment locations and subsequently monitoring the resulting item movements and item sales, an optimal item placement configuration may be determined. For example, a retailer may find that placing console games, which attract many customers, in shelves deep inside the computer store may result in increased sales of items placed on shelves located near the most direct route to the console games.

The shelf watch application also may be used to optimize or improve the placement of items on warehouse and retail store shelves by decreasing the number of misplaced items in the store. For example, the shelf watch application may generate a message every time a threshold number of items are misplaced on the shelves. The message may include a location of each misplaced item and the proper location for the item. The message may be used by employees to periodically traverse the store or warehouse and place the misplaced items back into their proper locations. In some implementations the shelf watch application may be combined with a pick-to-light system to facilitate placement of items back into their proper locations. For example, the pick-to-light system may receive the messages detailing misplaced item(s), their current location, and their proper location from the shelf watch application. The pick-to-light system may then guide an employee to the locations of the misplaced items and to the correct locations for those items by illuminating a light or activating an indicator associated with each location (e.g., the locations of the misplaced items may be indicated by a red light and the locations of the correct locations are illuminated by a green light).

Generally, the shelf watch application may send a message to an entity when an event relating to item movement occurs. The event may include those discussed above with respect to inventory management and item placement optimization but also may include events that are specifically directed to monitoring customer behavior. For example, a retailer may desire to track the effect of item price changes on customer behavior as derived from movement and subsequent purchases of items. Specifically, a retailer may desire to receive a message when an item is removed from a shelf but, instead of being bought, is put back on the shelf. A retailer also may desire to prevent item theft by receiving a message when an item is removed from a shelf but not bought and not put back on the shelf after a predetermined time. Similarly, a warehouse manager may desire to know when an item is removed from a shelf and not put back, and subsequently not reflected in a packing slip or other warehouse item tracking mechanism after a predetermined time.

The retailer (i.e., retail store manager) or warehouse manager may receive event messages and monitor item movement by accessing the computer 105 of the item identification system 100. The computer 105 may be accessed over a network including, but not limited to, the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), and a delivery mechanism for carrying data (e.g., radio, television, cable, or satellite). The computer 105 also may be accessed using a third party content based messaging (CBM) service such as, for example, Elvin, CosNotif, JMS, Keryx, and Gryphon CBM services.

Figure 9:
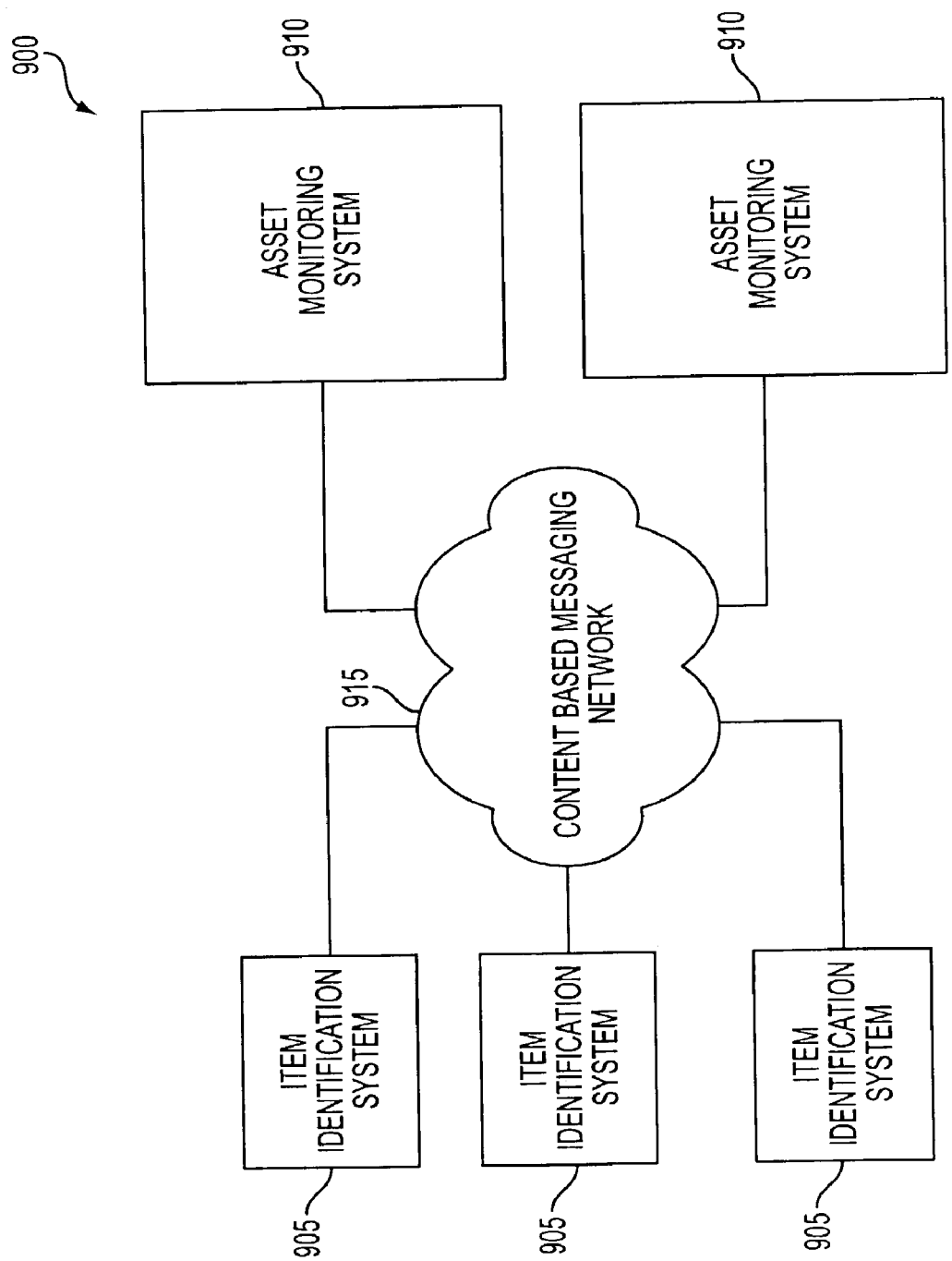
FIG. 9 is a functional block diagram for an asset monitoring system.

Referring to FIG. 9, an asset monitoring system 900 may include one or more item identification systems 905 that distribute item-related data on a real-time or near-real-time basis to one or more asset monitoring systems 910 using a content based messaging (CBM) service network 915.

The item identification systems 905 may be used by warehouse or retail store managers to detect and publish data related to items placed on all of the shelves in a given location such as, for example, a retail store or a warehouse. Each item identification system 905 typically has attributes comparable to those described with respect to the item detection system 100 of FIGS. 1-8. The item identification systems 905 provide item-related data to the CBM network 915 (i.e., publish the data to the CBM network 915) and may update the item-related data in real time to reflect the current configuration of items on the shelves.

The item-related data provided by the item identification systems 905 may include identification data for each item (i.e., item location and item ID) and/or processed identification data (e.g., total number of items of a given type or the total number of items in a given store or warehouse location). Additionally or alternatively, the item-related data may include any of the messages generated by the item movement-related events discussed above (e.g., messages generated when the number of items of a given type decreases below a threshold or when a certain quantity of items are misplaced on the shelves).

The asset monitoring systems 910 may be used by manufacturers or distribution center managers to access the item-related data published by the warehouses and/or retail stores that receive items from or are otherwise linked to the manufacturer or distribution center. The manufacturer or distribution center manager registers interest (i.e., a subscription) in the CBM network 915 to receive the item-related data published by the item identification systems 905 of these warehouses and/or retail stores. The asset monitoring system 910 may include a computer (not shown) employing an asset monitoring application capable of receiving item-related data published on the CBM network 915. The asset monitoring application may further process the item-related data received from the CBM network 915 to serve the specific needs of the manufacturer or distribution center. For example, a total number of items per product name may be calculated for one or more of the retail stores or warehouses.

The CBM network 915 receives and distributes item-related data. The CBM network 915 may include one or more data processing and distributions devices (e.g., servers, associated communications media, and data transport systems). For example, the CBM network 915 may include one or more filtering servers that receive published item-related data from the item identification systems 905 and generate notifications that are transmitted to the asset monitoring systems 910 that subscribe to the data. The filtering server may compute the registered subscriptions that match a published event or action taken by the item identification systems 905 and generate a notification (i.e., a description of the real world occurrence) that is sent to the asset monitoring systems 910 determined from the computed subscriptions.

The events may correspond to any item movement-related events including those discussed previously with respect to the shelf watch application, and the notifications may correspond to messages detailing the events. In one implementation, an event occurs when the number of items of a given type decreases below a threshold, and an out-of-stock notification is sent to the manufacturer requesting that the manufacturer ship more items to the corresponding warehouse or retail store. In another implementation, an event occurs when a predetermined number of items produced by the manufacturer are placed in different shelf locations than those agreed to in a shelf placement contract with the retailer. A contract violation notification is then sent to the manufacturer informing the manufacturer of the violation. In another implementation, an event occurs when a scan is completed by the master reader MPUs of a given item identification system 905 and the collected item identification data is published to the CBM network 915. The notification of the event may be the item identification data collected by the scan.

The asset monitoring system 900 provides event-driven network communications that allow essentially real-time or near real-time communication of item-related data between the item identification systems 905 and the asset monitoring systems 910 by avoiding communication delays and wasted network bandwidth associated with polling for data. The CBM network 915 allows the item identification systems 905 and the asset monitoring systems 910 to be thousands of miles apart from each other while still achieving real-time or near real-time communications (e.g., a manufacturer may be notified that a customer removed one of his products from a shelf located in a retail store thousands of miles away from the manufacturer). Additionally, processing and overhead associated with addressing may be greatly reduced because each item identification system 905 and each assent monitoring system 910 do not need to know about each other (and their addresses).

In one implementation of the asset monitoring system 900, retailers publish to the CBM network 915 unprocessed item identification data collected by identification systems 905 using the shelf watch application. Manufacturers subscribe to receive this unprocessed item identification for stores carrying items produced by the manufacturer (i.e., the item ID includes the name of the manufacturer). The manufacturer receives the unprocessed identification data using the asset monitoring system 910. The asset monitoring application of the asset monitoring system 910 processes the item identification data to determine the total number of items per product name for the given item manufacturer per retail store (i.e., the total number of items in the store having the same manufacturer and product name in the item ID). In another implementation, the shelf watch application of the item identification systems 905 calculates and publishes the total number of items per product name per manufacturer instead of or in addition to publishing the unprocessed item identification data. The asset monitoring application then receives directly from the CBM network 915 the total number of items per product name for the given manufacturer per retail store.

Figure 10:
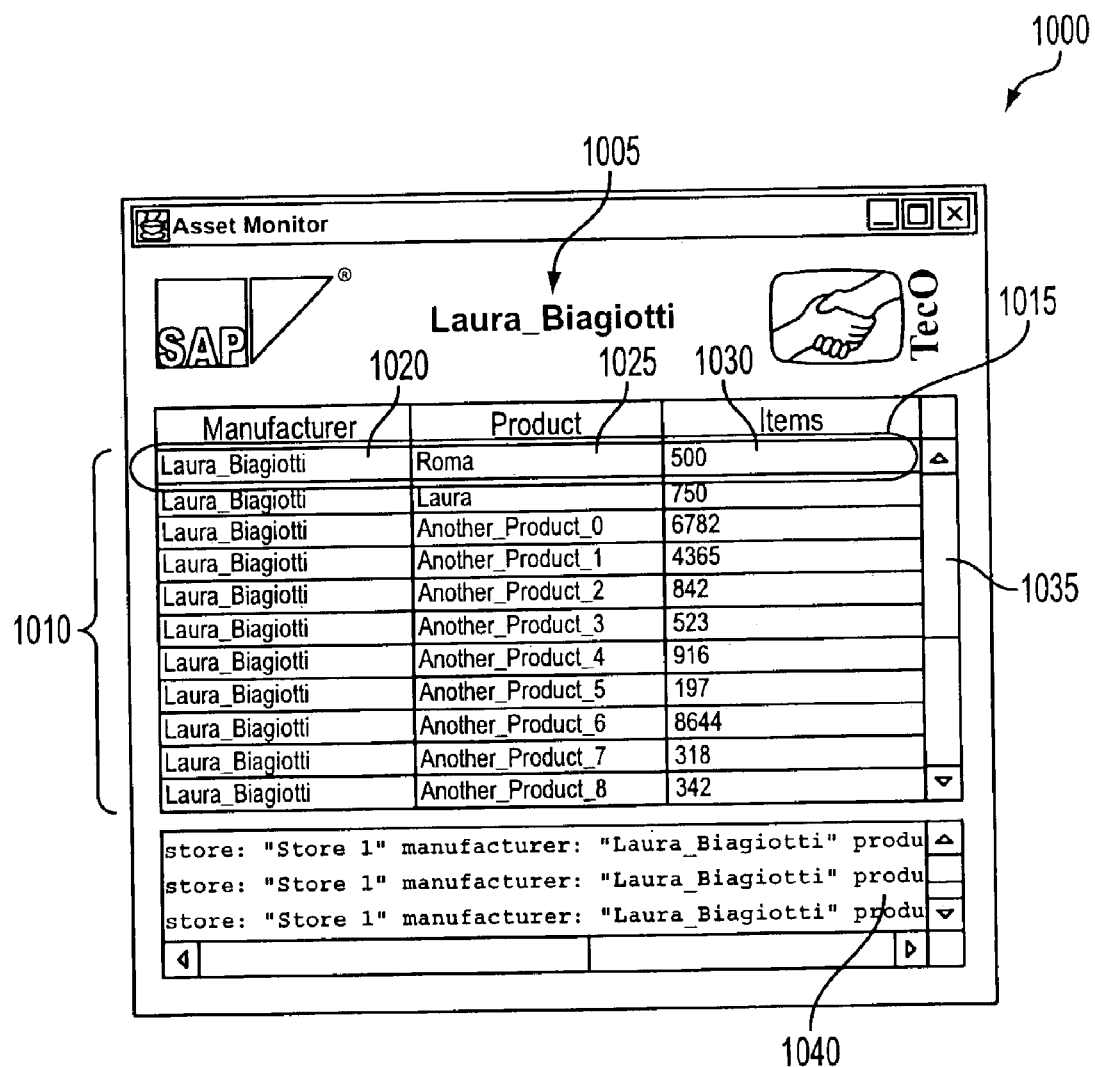
FIG. 10 shows a user interface for an asset monitoring application.

Referring to FIG. 10, the asset monitoring application may provide a user interface 1000 that displays the total number of items per product name for a given manufacturer per retail store. The interface 1000 includes a header 1005 displaying a name of the manufacturer (e.g., Laura Biagiotti) whose products are currently displayed. The interface 1000 includes a list 1010 of product entries. Each product entry 1015 may include three data entries displaying: (1) the manufacturer of the product 1020; (2) the name of the product 1025; and (3) the number of products in the store 1030 (i.e., the number of items with item IDs that include the manufacturer and the product name). A scroll bar 1035 may be used to scroll through the list 1010. In another implementation, the product entries 1015 may further include the name of the store corresponding to the product entry 1015 being displayed (e.g., "store 1"). The interface 1000 may include a window 1040 that displays more detailed item identification data retrieved by the asset monitoring system 910.

A number of implementations have been described. Nevertheless, it will be understood that various modifications may be made. For example, the asset monitoring application described with respect to FIGS. 9 and 10 may run on the same computer 105 as the shelf watch application or on a computer in the same LAN. In this implementation, the asset monitoring application may be used by a retail store manager to keep track of the store inventory and observe behavior of customers in a similar fashion as that described above with respect to the shelf watch application.

The item identification system 100 may not be limited to detecting items on shelves. Rather, the same principles may apply to detecting items on or near any surface capable of covering inductor coils and permeable to magnetic fields (e.g., a wall rather than a shelf).

Accordingly, these and other implementations are within the scope of the following claims.

What is claimed is:

1. A system to monitor item placement and item movement on surfaces, the system comprising:

an identification system embedded in one or more surfaces and operable to generate data related to items placed on the surfaces by periodically scanning the surfaces, the data including item type, item location on each surface, and number of items placed on each surface, the identification system comprising an RF-ID system configured to:

receive a first electronic indication of a physical size of items to be placed on a first portion of a surface of a shelf in which is embedded a first group of inductor coils, in response to the first electronic indication and conditioned on the first electronic indication representing that the physical size of the items is relatively large, set a strength of a magnetic field generated by the first group of inductor coils during scanning to a first magnetic field level for detecting RF-ID tags of items placed on the first surface portion of the shelf, and in response to the first electronic indication and conditioned on the first electronic indication representing that the physical size of the items is relatively small, set the strength of the magnetic field generated by the first group of inductor coils during scanning to a second magnetic field level for detecting RF-ID tags of items placed on the first surface portion of the shelf, the second magnetic field level being less than the first magnetic field level; and a computer configured to receive and process the data to monitor item placement and item movement on the surfaces.

2. The system of claim 1, wherein the item type includes one or more of an individual item number, an item name, an item manufacturer name, or an item product name.

3. The system of claim 1, wherein the RF-ID system includes a set of inductor coils, including the first group of coils, embedded in the surfaces that are energized during the scanning.

4. The system of claim 3, wherein the RF-ID system includes one or more reader microprocessor units and RF-ID tag readers that generate the item-related data by selectively energizing the set of inductor coils.

5. The system of claim 1, wherein the scanning is continuous so as to provide item-related data that may be used to monitor item placement and movement on the surfaces in real-time.

6. The system of claim 1, wherein the surfaces are surfaces of one or more shelves.

7. The system of claim 1, wherein the computer provides a user interface that displays a graphical representation of one of the surfaces and the items on the surface.

8. The system of claim 1, wherein the items are products in a store or in a warehouse and the surfaces are the surfaces of one or more store shelves or warehouse shelves.

9. The system of claim 8, wherein the computer generates a message when the number of items placed on the surfaces of store shelves or warehouse shelves decreases below a predetermined threshold.

10. The system of claim 9, wherein the message is an out-of-stock message and the items are all associated with a specific item manufacturer name or item product name.

11. The system of claim 8, wherein the computer determines whether items are correctly placed on portions of the surfaces of warehouse shelves or store shelves assigned to carry the items by comparing the item location on the surfaces of the shelves with shelf assignment data.

12. The system of claim 11, wherein the computer generates a message when a number of items incorrectly placed on the surfaces of store shelves or warehouse shelves increases above a predetermined threshold.

13. The system of claim 8, wherein the computer processes the item-related data to determine an item placement on the surfaces of shelves that increases item sales.

14. The system of claim 8, wherein the computer generates a message when an event relating to item movement on the surfaces of shelves occurs.

15. The system of claim 14, wherein the event corresponds to an item being removed from the surface of a store shelf and neither bought nor put back on any shelves in the store for a predetermined amount of time.

16. The system of claim 14, wherein the event corresponds to items being moved from the surfaces of shelves in response to changing the price of the items.

17. The system of claim 8, wherein the computer provides the item-related data to a content based messaging network and updates the item-related data in real-time based on repeated scanning of the surfaces of the shelves.

18. The system of claim 17, wherein the item-related data is accessible to a manufacturer or a distribution center associated with the store or the warehouse.

19. A system comprising:
an RF-ID item identification system operable to periodically generate data related to placement and movement of items in one or more supply chain nodes, the RF-ID item identification system being configured to:
  receive an electronic indication of a physical size of items to be placed on a portion of a surface of a shelf in which is embedded a group of inductor coils,
  in response to the electronic indication and conditioned on the electronic indication representing that the physical size of the items is relatively large, set a strength of a magnetic field generated by the group of inductor coils during scanning to a first magnetic field level for detecting RF-ID tags of items placed on the surface portion of the shelf, and
  in response to the electronic indication and conditioned on the electronic indication representing that the physical size of the items is relatively small, set the strength of the magnetic field generated by the group of inductor coils during scanning to a second magnetic field level for detecting RF-ID tags of items placed on the surface portion of the shelf, the second magnetic field level being less than the first magnetic field level; and
a supply chain management system configured to receive and process the data to monitor inventory or customer behavior in the one or more supply chain nodes.

20. The system of claim 19, wherein the data is generated in real time.

21. The system of claim 19, wherein the supply chain node comprises a retail store and the items are goods in the store.

22. The system of claim 19, wherein the supply chain node comprises a warehouse.

23. The system of claim 19, wherein the placement and movement of items includes placement and movement of items on shelves.

24. The system of claim 23, wherein the RF-ID item identification system includes multiple RF-ID systems, each embedded in a shelf.

25. The system of claim 24 wherein each RF-ID system includes one or more master reader microprocessors each communicating with a plurality of slave reader microprocessors.

26. The system of claim 19 wherein the supply chain management system includes a computer that receives the data and publishes it to a content-based messaging network.

27. The system of claim 26 wherein a manufacturer or distribution center may access the data in real-time by subscribing to receive the data from the content-based messaging network.

28. A system comprising:
a content based messaging network;
an identification system embedded in one or more surfaces and operable to generate data related to items placed on the surfaces by periodically scanning the surfaces, the data including item type, item location on each surface, and number of items placed on each surface, the identification system comprising an RF-ID system configured to:
  receive an electronic indication of a physical size of items to be placed on a portion of a surface of a shelf in which is embedded a group of inductor coils,
  in response to the electronic indication and conditioned on the electronic indication representing that the physical size of the items is relatively large, set a strength of a magnetic field generated by the group of inductor coils during scanning to a first magnetic field level for detecting RF-ID tags of items placed on the surface portion of the shelf, and
  in response to the electronic indication and conditioned on the electronic indication representing that the physical size of the items is relatively small, set the strength of the magnetic field generated by the group of inductor coils during scanning to a second magnetic field level for detecting RF-ID tags of items placed on the surface portion of the shelf, the second magnetic field level being less than the first magnetic field level;

a first computer configured to receive, process, and periodically publish the data to the content based messaging network, the first computer associated with a first supply chain node; and a second computer configured to periodically receive the data from the content based messaging network, the second computer associated with a second supply chain node.

29. The system of claim 28, wherein the first supply chain node is a retailer and the second supply chain node is a manufacturer or distribution center.

30. The system of claim 1, wherein the RF-ID system is further configured to:

receive a second electronic indication of a physical size of items to be placed on a second portion of the surface of the shelf in which is embedded a second group of inductor coils, the second electronic indication being different from the first electronic indication, the second portion of the surface being different from the first portion of the surface, and the second group of inductor coils being different from the first group of inductor coils;

in response to the second electronic indication and conditioned on the second electronic indication representing that the physical size of the items is relatively large, set a strength of a magnetic field generated by the second group of inductor coils during scanning to a third magnetic field level for detecting RF-ID tags of items placed on the second surface portion of the shelf, and in response to the second electronic indication and conditioned on the second electronic indication representing that the physical size of the items is relatively small, set the strength of the magnetic field generated by the second group of inductor coils during scanning to a fourth magnetic field level for detecting RF-ID tags of items placed on the second surface portion of the shelf, the fourth magnetic field level being less than the first magnetic field level.

31. The system of claim 30, wherein the first electronic indication represents that the physical size of the items to be placed on the first surface portion of the shelf is relatively large and the second electronic indication represents that the physical size of the items to be placed on the second surface portion of the shelf is relatively small such that the RF-ID system sets the strength of the magnetic field generated by the first group of inductor coils to a first magnetic field level and sets the strength of the magnetic field generated by the second group of inductor coils to a fourth magnetic field level, the fourth magnetic field level being less than the first magnetic field level.

* * * * *